United States Patent [19]

Gokyu

[11] 4,019,357
[45] Apr. 26, 1977

[54] METHOD OF MAKING REINFORCEMENTS FOR CONCRETE

[75] Inventor: Isao Gokyu, Musashino, Japan

[73] Assignee: Nippon Concrete Industries Co. Ltd., Tokyo, Japan

[22] Filed: Nov. 10, 1975

[21] Appl. No.: 630,626

[52] U.S. Cl. .................................. 72/130; 72/186;
72/203; 72/330; 72/337; 72/338; 72/294
[51] Int. Cl.² ........................................ B21D 31/00
[58] Field of Search .............. 29/DIG. 15, DIG. 67,
29/95.4, 567, 412; 72/129–132, 185, 186,
324–326, 330, 332, 337, 338, 464, 203, 294,
334, 388; 83/42, 676; 10/29–32

[56] References Cited

UNITED STATES PATENTS

| 11,172 | 6/1854 | Miller | 10/32 |
|---|---|---|---|
| 62,553 | 3/1867 | Martin | 72/186 |
| 116,091 | 6/1871 | Paull et al. | 10/32 |
| 2,601,200 | 6/1952 | Amos et al. | 83/42 X |
| 3,425,251 | 2/1969 | Maytag | 72/294 |
| 3,504,516 | 4/1970 | Sundberg | 72/203 |
| 3,896,650 | 7/1975 | O'Konski | 72/186 |

FOREIGN PATENTS OR APPLICATIONS 359,372  10/1931  United Kingdom ................. 72/326

Primary Examiner—C.W. Lanham
Assistant Examiner—E. M. Combs
Attorney, Agent, or Firm—Fidelman, Wolffe & Waldron

[57] ABSTRACT

This invention relates to a method of making reinforcements for concrete, in which a band material of one or two overlapped very thin steel plates which has a certain thickness and a ceratin width is bent and cut at a rotating cutter wheel having cutting teeth which height is approximately twice the thickness of the said plate so that reinforcements of a certain dimension are continuously made; and an apparatus therefor comprising a cutter wheel, a pushing plate and a supporter which constitute a cutting part, and some couples of belt pulleys to continuously feed the material, or further having an equipment to bend both edges of the said material of two overlapped steel plates.

6 Claims, 19 Drawing Figures

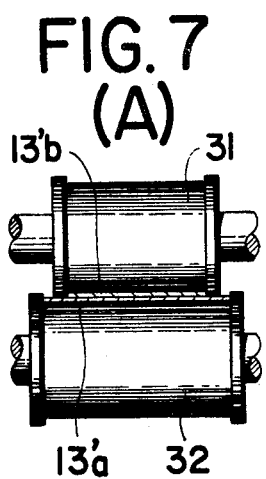
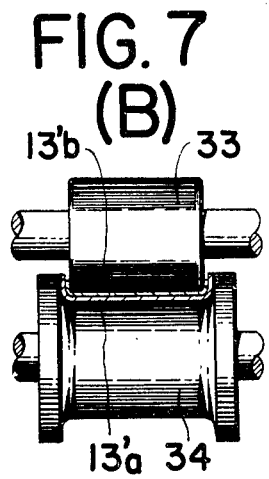
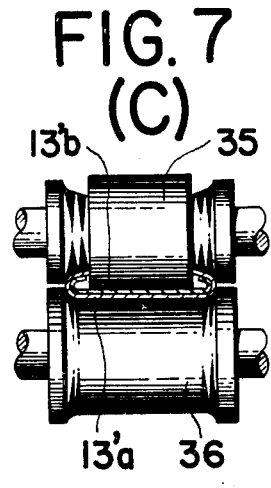
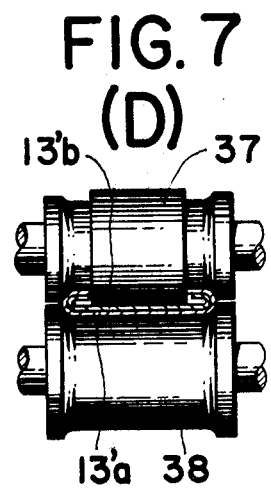
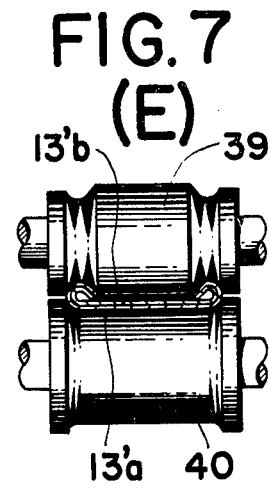
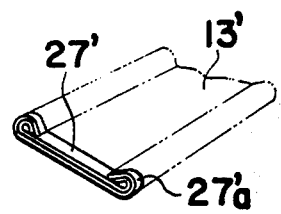
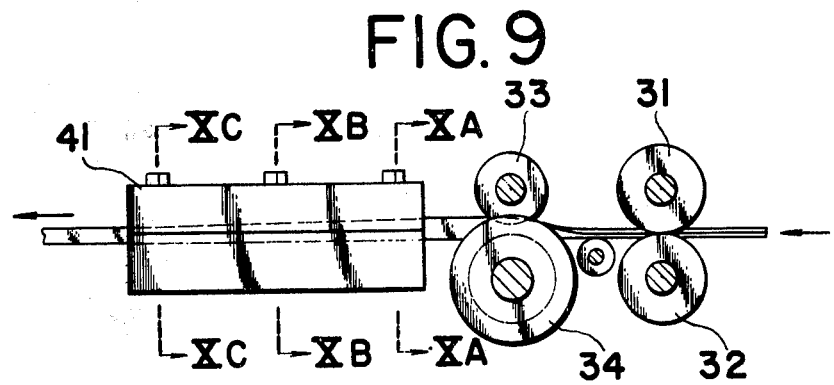

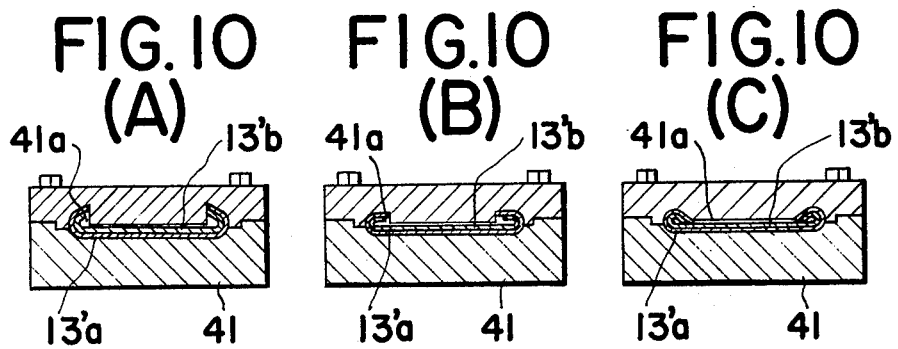

METHOD OF MAKING REINFORCEMENTS FOR CONCRETE

SUMMARY OF THE INVENTION:

This invention relates to a method of making reinforcements for concrete and an apparatus therefor.

For reinforcements to be mixed in concrete in order to improve the strength of the concrete, glass fiber, organic fiber, steel wires and the like have been used heretofore. Of these steel wires are good in adhesiveness and have a large resistance to the break and further can be easily mixed in concrete in comparison with other reinforcements. It has been experimentally proved that steel wires which are 0.2 - 0.5 mm. in diameter and 1 - 5 cm. in length are most desirable.

Steel wires of 0.2 - 0.5 mm. in diameter ae made by a wire drawing means. However it results in high cost. Therefore other method has been developed in which reinforcements of similar dimension are made by continuously cutting a band sheet which thickness is 0.2 - 0.5 mm. However if other conditions, for example quantity of scraps of generally used thin plates such as very thin tin plates, plates for shadow masks, or the like, are considered, cheap thin plates which thickness is less than 0.3 mm. are easily obtained. On the other hand if such very thin plates which thickness is less than 0.3 mm. are simply cut and formed into a linear shape, the durability of the linear substances is insufficient and thereby they are not suitable for reinforcements. In order to make them more suitable for reinforcements the sectional shapes thereof are changed or they are overlapped so that the durability is increased.

This invention is to provide a method of making reinforcements of superior property by bending and cutting very thin plates which thickness is less than 0.3 mm. by various means and an apparatus therefor. The first object of the present invention is to make reinforcements which are superior in durability from thin plates which thickness is less than 0.3 mm.

The second object of the present invention is to provide a method of efficiently executing the bending and cutting of thin plates as continuous operation and an apparatus therefor.

The third object of the present invention is to make reinforcements which are superior in adhesiveness to conventional steel wires.

The fourth object of the present invention is to provide a method in which scraps left at the time of cutting very thin steel plates which thickness is less than 0.3 mm. can be also utilized as materials and an apparatus therefor.

Other objects and the feature of the present invention will be apparent in some embodiment described later.

BRIEF DESCRIPTION OF THE DRAWINGS:

FIGS. 7 (A) to 7 (E) are cross-sectional views respectively along the lines VIIA — VIIA, VIIB — VIIB, VIIC — VIIC, VIID — VIID and VIIE — VIIE of FIG. 6;

FIG. 8 is a perspective view of a reinforcement made by an apparatus shown in FIGS. 4, 6 and 7;

FIG. 9 is a side elevation view of a bending equipment in other embodiment which is corresponding to the bending equipment shown in FIG. 6; and FIGS. 10 (A) to 10 (C( are enlarged cross-sectional views respectively along the lines Xa — XA, XB — XB and XC — XC of FIG. 9.

Figure 1:
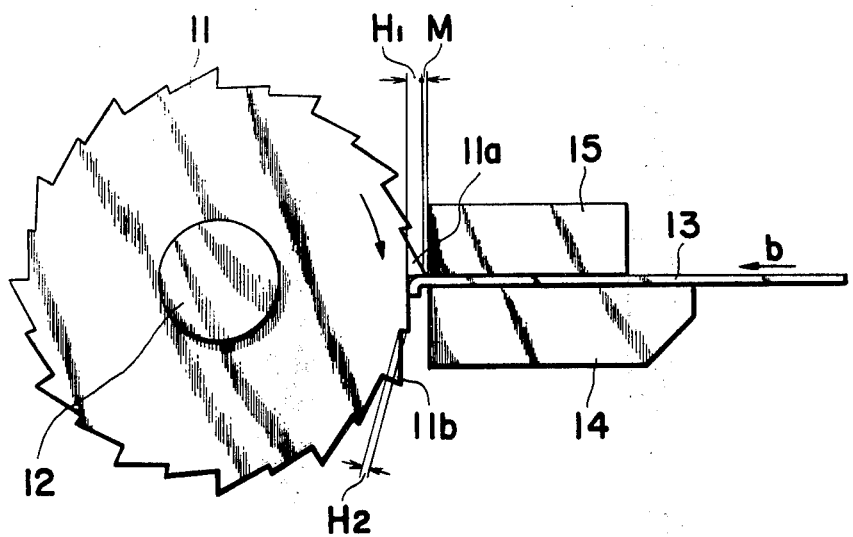
FIG. 1 is an enlarged fragmental side elevation view of a cutting part showing briefly the executing condition of the method according to the present invention.

DETAILED DESCRIPTION OF THE INVENTION:

FIG. 1 is an enlarged side elevation view of a cutting part fundamentally showing the executing condition of the method according to the present invention. Reference numeral 11 designates a cutter wheel having a number of cutting teeth 11a and a number of bending teeth 11b on the outer periphery one after the other. The cutter wheel 11 is put on a shaft 12 and is driven to rotate in the direction of arrow a. The height H1 of the cutting tooth 11a is approximately twice the thickness of a band material 13, i.e. in case the thickness of the material 13 is 0.18 mm., about 0.36 mm. The height H2 of the bending tooth 11b is lower than the height H1 by the thickness of the material.

Figure 2:
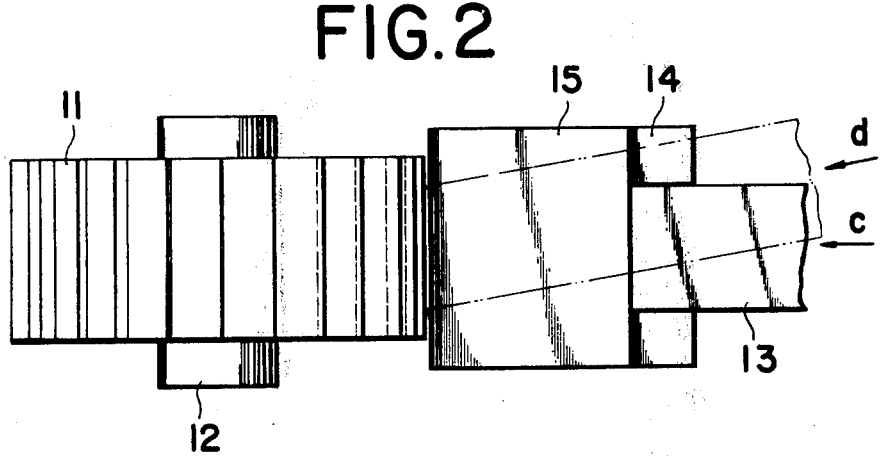
FIG. 2 is an enlarged fragmental plan view of the same part as shown in FIG. 1.

Reference numeral 14 designates a supporter receiving the material 13 at a cutting part. The supporter 14 is located at a position apart a certain distance M, about 0.05 mm., from the tip of the cutting tooth 11a. Reference numeral 15 designates a pushing plate to press the material 13 placed on the supporter 14. The pushing plate 15, the supporter 14 and the cutter wheel 11 constitute a cutting part. FIG. 2 is a plan view showing the above cutting state. The band material 13 is fed in the direction of arrow c which is perpendicular to the cutting tooth 11a. It is also possible to feed the material 13 slantingly in the direction of arrow d as shown by a two-dotted line. In case it is fed slantingly, long reinforcements can be obtained even from a narrow material in comparison with the case the material is fed perpendicularly. Moreover it is possible to use scraps left at the time of cutting a wide thin steel plate which width is 10 - 50 mm. as band materials.

Figure 3:
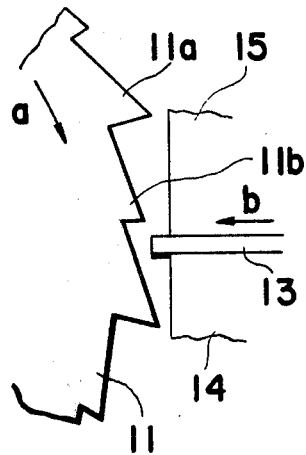
FIGS. 3 (A) to 3 (D)are enlarged fragmental side elevation views showing conditions in which a material is bent and cut by a cutter wheel.
Figure 3:
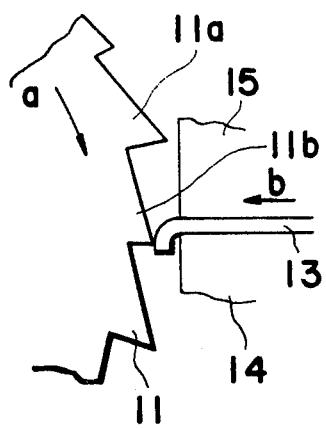
Figure 3:
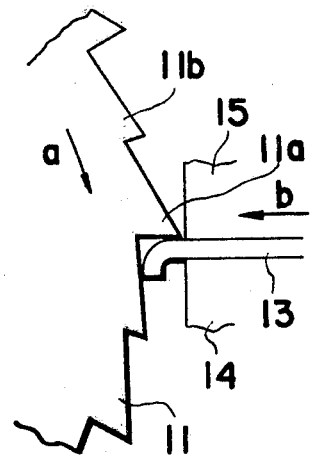
Figure 3:
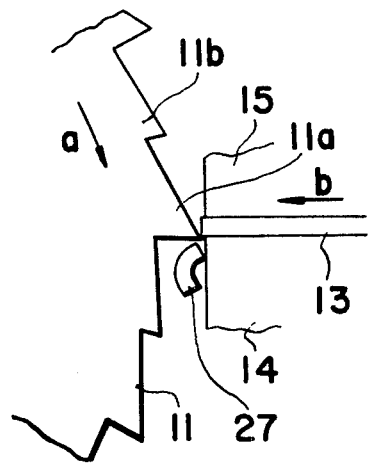

FIGS. 3 (A) to 3 (D) are enlarged fragmentary side elevation views showing the operations of bending and cutting the material by the said cutter wheel in order. In FIG. 3 (A) the material 13 is fed in the direction of arrow b to contact it with the rear surface of the cutting tooth 11a of the rotating cutter wheel. Next the forward end of the material 13 contacts with the bending tooth 11b, and thereby the protruded end of the material 13 is pressed from the upper side by the bending tooth 11b and bent so that the forward end is formed into angular or L-shaped cross-section as shown in FIG. 3 (B). Subsequently the material 13 is further protruded as it contacts with the rear surface of the bending tooth 11b as shown in FIG. 3 (C) and cut by the cutting tooth 11a, and the cut material drops downward as shown in FIG. 3 (D).

Figure 4:
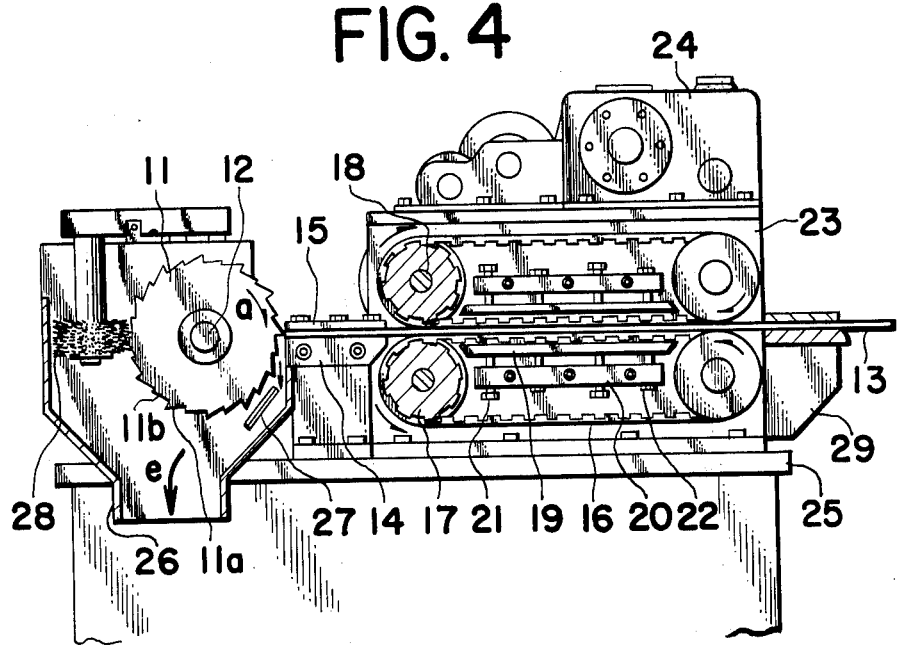
FIG. 4 is a partially sectional side elevation view showing a main part of a cutting equipment of the present invention.

FIG. 4 is a partially sectional side elevation view embodying the cutting equipment shown in FIGS. 1 to 3. Two or more couples of pulleys 17 for feeding materials are provided with endless belts 16 made of rubber, plastic or the like put on the outer peripheries, and they are supported by shafts 18 at the upper and lower positions facing each other at the rear part of the supporter 14 and the pushing plate 15. The material 13 is held between the belt pulleys 17 and continuously fed to the cutting part by the rotation of the pulleys. The outer surface of the pulley 17 and the inner surface of the belt 16 have concave and convex parts which engage with each other, and thereby the slip of them is prevented.

Reference numeral 19 designates belt holders respectively provided on the inner side of each belt 16. The belt holders 19 push the belts 16 at the position they are adjacent to each other from the upper and lower sides in order to firmly hold the material 13 placed between the belts. Reference numeral 20 designates brackets to support the said belt holders 19 through pushing bolts 21 and drawing bolts 22, 23 designates a frame supporting the belt pulleys 17 and the brackets 20 on the side surface and a speed reduction mechanism 24 on the upper surface, and 25 designates a bed supporting the whole part of the apparatus. The shaft 12 of the cutter wheel 11 is also supported on the bed 25.

Reference numeral 26 designates a shoot provided at the lower part of the cutter wheel 11. The shoot 26 receives the cut materials, i.e. reinforcements 27, to lead them to a certain place as shown by arrow $e$. Reference numeral 28 designates a brush made of wire or the like which is always rotating as it contact with the teeth 11a and 11b of the cutter wheel 11 on the opposite side of the cutting part to remove the reinforcements 27 and scraps attaching to the outer periphery of the cutter wheel 11. Reference numeral 29 designates a guide for introducing the material provided at the rear part of the pulleys 17.

Figure 5:
FIG. 5 is a perspective view of a reinforcement made by the cutter wheel shown in FIGS. 1 to 3.

The method of making the reinforcements 27 using the above described apparatus will be described hereinafter. The material 13 is first held between the upper and lower belts 16 put around the pulleys 17 and fed in the direction of arrow $b$ by the rotation of the pulleys 17. The material 13 is subsequently slided and held between the supporter 14 and the pushing plate 15, and the material protruded beyond the forward end of the supporter 14 is bent by the bending tooth 11b and next cut by the cutting tooth 11a. Thereafter a reinforcement 27 of a shape shown in FIG. 5 is dropped and exhausted from the shoot 26. As for the mechanical and operational conditions at the time of making the reinforcements, for example numbers of cutting teeth and bending teeth are both 30, height H1 of the cutting tooth is 0.36 mm., height H2 of the bending tooth is 0.18 mm., revolutional speed of the cutter wheel is 100 r.p.m., and the material feeding speed is 900 mm./min.

The reinforcement 27 shown in FIG. 5 has an angular or L-shaped cross-section (including the case the bent corner has a circular arc). Therefore regardless it is made from a thin plate which thickness is less than 0.3 mm., it is not deformed by the external force acting perpendicularly to the longitudinal direction of the reinforcement but has excellent durability. Since such reinforcements are obtained by continuously feeding band materials of thin plates, the process is very simple. Moreover since scraps of very thin tin plates, plates for shadow masks, or the like can be used as materials, materials can be easily obtained. Therefore reinforcements can be made cheap.

Figure 6:
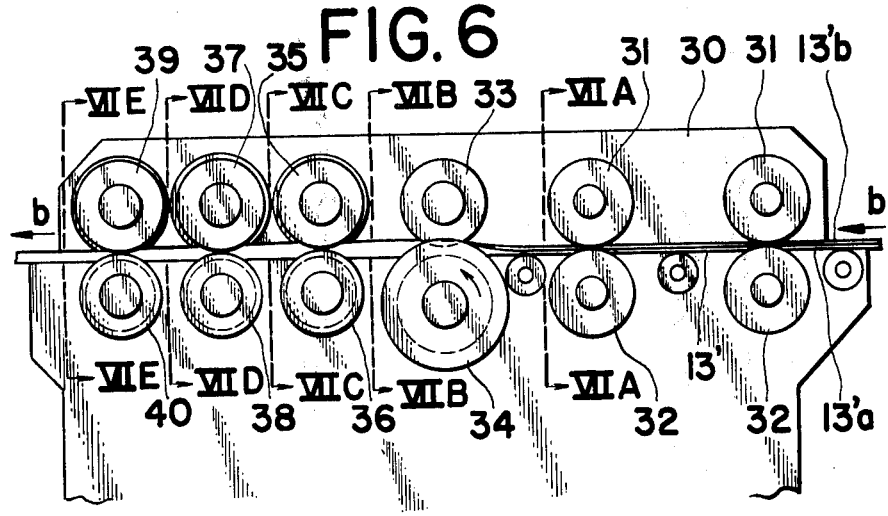
FIG. 6 is a partially sectional side elevation view showing a main part of a bending equipment connected to the rear part of the cutting equipment.

FIG. 6 shows one example of an edge bending equipment in which edges of two overlapped band materials 13'a and 13'b of thin plates are bent in order to make reinforcements 27' of a shape shown in FIG. 8. This equipment is continuously connected to the rear part (right side in the drawing) of the cutting equipment shown in FIG. 4. In this case the cutter wheel 11 of the cutting equipment has only cutting teeth 11a, but does not have bending teeth 11b. Because, since the said reinforcement 27' shown in FIG. 8 is made overlapping two materials 13'a and 13'b and making them into one body, it has already a certain durability regardless it is made from thin plate materials, and thereby it is not required to bend the materials to form an angular part.

Reference numeral 30 designates a frame of the edge bending equipment. The frame 30 is provided with rollers 31 and 32 (shown in FIG. 7 (A)) to introduce and feed two materials 13'a and 13'b from the rear side in the manner the centers of the materials coincide with each other, and a couple of rollers 33 and 34 (shown in FIG. 7 (B)) to bend the materials 13'a and 13'b into channel shapes supported by shafts in order from the rear side.

Reference numerals 35, 36, 37, 38, 39 and 40 are rollers to bend further inside both edges of the materials 13'a and 13'b bent by the said rollers 33 and 34. The surfaces of each couple of rollers have concave, convex and round parts in order to gradually bend the materials 13'a and 13'b as shown in FIGS. 7 (A) to 7 (E).

The materials 13'a and 13'b are bent at both edges while they are sent being held between each couple of rollers, and they are joined into one band material. The joined material is fed to the cutting equipment shown in FIG. 4 to be cut. The reinforcement 27' made as abovedescribed has bent parts 27'a at both edges as shown in FIG. 8, and its width is approximately same as the thickness of the joined material.

FIG. 9 shows other example of an edge bending equipment having similar function to that of the edge bending equipment shown in FIG. 6. Instead of rollers 35 to 40 in FIG. 6 a die 41 is provided. A hole 41a is penetrating through the die 41 along the forwarding direction of the materials 13'a and 13'b. The sectional shape of the hole 41a gradually changes so that the edges of the materials 13'a and 13'b are bent as shown in FIGS. 10 (A) to 10 (C).

The shape in FIG. 10 (A) is only to receive the channel shaped material 13' and has round parts to bend the both edges of the material 13' inside a little. At the positions shown in FIGS. 10 (B) and 10 (C) the both edges of the material 13' are bent further inside. After the material 13' is inserted through such a hole 41a, it is formed into a shape shown in FIG. 8. The band material 13' of the said shape is fed to the cutting equipment shown in FIG. 4 and cut there similarly to the case using the equipment shown in FIG. 6.

Since the reinforcement 27' of a shape shown in FIG. 8 has bent parts 27'a at both edges, two band materials ae firmly joined and the joined material has excellent durability. When it is mixed in concrete it is adhered to concrete very well, and thereby neither the break nor cracks of concrete are caused.

I claim:

1. A method of making reinforcements for concrete, said reinforcements being cut from an elongated strip of thin metal, comprising the steps of:

rotating a cutter wheel having a circular surface about its rotational axis, said cutter wheel being of finite length and diameter, said cutter wheel including a plurality of cutting teeth extended a first distance from said circular surface of said cutter wheel, and a plurality of bending teeth extended a second distance from said circular surface of said cutter wheel, said second distance being less than said first distance, and said bending teeth and said cutting teeth being aligned parallel to said rotational axis of said cutter wheel, and said cutting teeth and said bending teeth spaced alternately around said circular surface of said cutter wheel;

supporting said metal strip relative to said cutter wheel on a supporter having a planar supporting surface parallel with said axis of rotation of said cutter wheel, and said supporter positioned apart from said cutter wheel such that the clearance between an adjacent edge of said supporter and a most extended edge of said cutting teeth causes shearing of the metal strip by said cutting teeth when said cutter wheel is rotated and said metal strip bridges said clearance;

moving said metal strip, the width of said metal strip not exceeding said finite length of said cutter wheel, against said rotating cutter wheel with said extended teeth;

bending said metal strip by contact of one of said bending teeth with said metal strip;

moving said bent metal strip against said rotating cutter wheel;

shearing said bent metal strip parallel to the bend by contact of one of said cutting teeth, whereby said metal strip is first bent by one of said bending teeth and a portion is subsequently sheared off said strip by one of said cutting teeth, said cutting tooth next following said bending tooth.

2. The method of claim 1 wherein the steps of moving, bending, moving and shearing of said metal strip are performed repetitively in sequence.

3. The method of claim 1 further comprising the step of constraining said metal strip to rest on said supporting surface of said support.

4. The method of claim 1 wherein sheet metal scraps having a width not in excess of said width of said cutter wheel are moved against said cutter wheel.

5. The method of claim 1 wherein said metal strip is moved against said cutter wheel, the direction of movement of said metal strip being perpendicular relative to said rotational axis of said cutter wheel.

6. The method of claim 1 wherein said metal strip is moved against said cutter wheel, the direction of movement of said metal strip being slanted away from a perpendicular to said rotational axis of said cutter wheel.

* * * * *